Sept. 1, 1931.  N. D. LEVIN  1,821,438

APPARATUS FOR HANDLING COAL

Original Filed Jan. 21, 1926  8 Sheets-Sheet 1

Sept. 1, 1931.  N. D. LEVIN  1,821,438
APPARATUS FOR HANDLING COAL
Original Filed Jan. 21, 1926  8 Sheets—Sheet 2

Sept. 1, 1931.  N. D. LEVIN  1,821,438
APPARATUS FOR HANDLING COAL
Original Filed Jan. 21, 1926  8 Sheets—Sheet 3

Sept. 1, 1931. N. D. LEVIN 1,821,438
APPARATUS FOR HANDLING COAL
Original Filed Jan. 21, 1926 8 Sheets-Sheet 4

Sept. 1, 1931.  N. D. LEVIN  1,821,438
APPARATUS FOR HANDLING COAL
Original Filed Jan. 21, 1926  8 Sheets-Sheet 5

Sept. 1, 1931. N. D. LEVIN 1,821,438

APPARATUS FOR HANDLING COAL

Original Filed Jan. 21, 1926   8 Sheets-Sheet 7

Patented Sept. 1, 1931

1,821,438

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

APPARATUS FOR HANDLING COAL

Application filed January 21, 1926, Serial No. 82,809. Renewed January 13, 1931.

The present invention relates to certain new and useful improvements in apparatus for handling coal, and particularly to apparatus adapted for use in a coil mine, to gather coal from a broken down and dislodged mass, convey it away from the mass, and discharge at any desired point.

In my co-pending application, Serial No. 735,583, filed September 3, 1924, I have disclosed a conveying mechanism composed of flexibly connected and readily detachable sections, adapted to extend along a relatively long coal face, and to be bodily moved laterally of said coal face; and discharge it into suitably positioned receptacles adjacent the extremity of said face for transportation from the mine. As there illustrated, the conveying mechanism is adapted to transport the coal in one direction only, the direction of operation being determined at the time of manufacturing the apparatus.

It is the object of this invention to provide, in a mechanism such as above described, an improved frame construction whereby certain parts may be readily and expeditiously adjusted to adapt the mechanism to transport material either towards the right hand or towards the left hand extremity of the coal face.

A further object is to provide improved means for bodily moving the conveyor in a lateral direction relative to the material which is to be gathered and transported.

The means whereby I attain these objects are fully set forth in the following specification, reference being had to the accompanying drawings in which I have illustrated one physical embodiment of my invention:—

As shown in the drawings, in which like numbers indicate like parts in the several views, my improved loading apparatus comprises a sectional frame of suitable length adapted to rest upon and slide over the mine floor, and having guideways of proper formation in its lateral edges which receive, and in which travels, the endless conveyor chain 1, to which are attached the conveyor flights 2 by which the coal is gathered and propelled to the point of transportation. The frame above referred to is composed of a plurality of separable sections A, B and C, which are connected together in a manner which affords flexibility in both vertical and horizontal planes. The head frame section A, supports the power devices by which the conveyor chain 1 is driven, and the foot frame section C contains the foot wheel around which the chain 1 passes to change its direction of travel. Intermediate these frame sections A and C may be positioned any preferred number of the intermediate frame sections B to adjust the overall length of the conveyor to that of the coal face along which the dislodged coal is to be gathered.

This frame and conveyor chain, with its attached flights, provides a flexible arrangement which adapts itself readily in both vertical and horizontal directions to the conditions under which the apparatus is manipulated.

Figure 9:
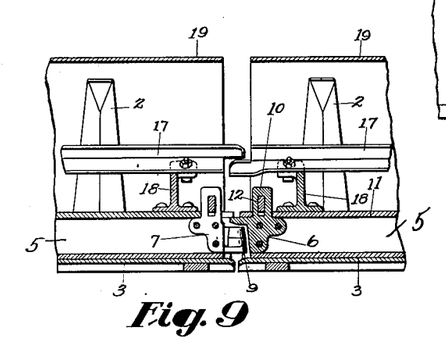
Fig. 9 is a vertical sectional view taken substantially along the longitudinal center line at the coupling of two of the intermediate sections of the conveyor.
Figure 10:
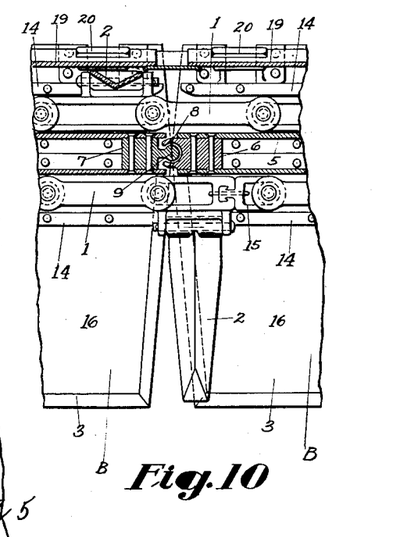
Fig. 10 is a horizontal sectional view of the parts shown in Fig. 8.
Figures 11, 12:
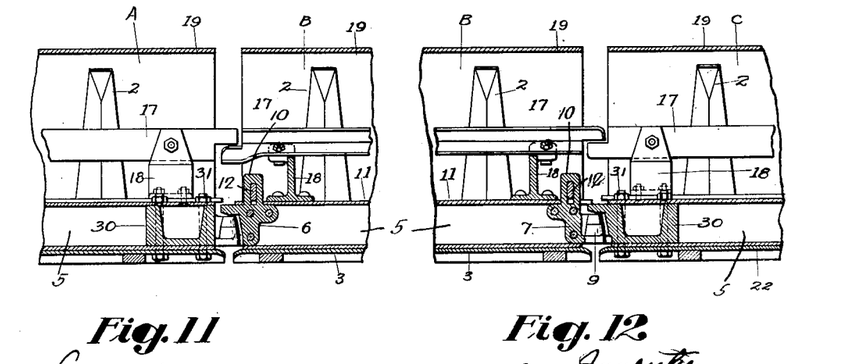
Fig. 11 is a vertical sectional view taken substantially along the longitudinal center line of the conveyor at the junction of the head section and the first intermediate section.
Fig. 12 is a vertical section taken substantially along the longitudinal center line of the conveyor at the junction of the foot section with the last intermediate section.
Figure 13:
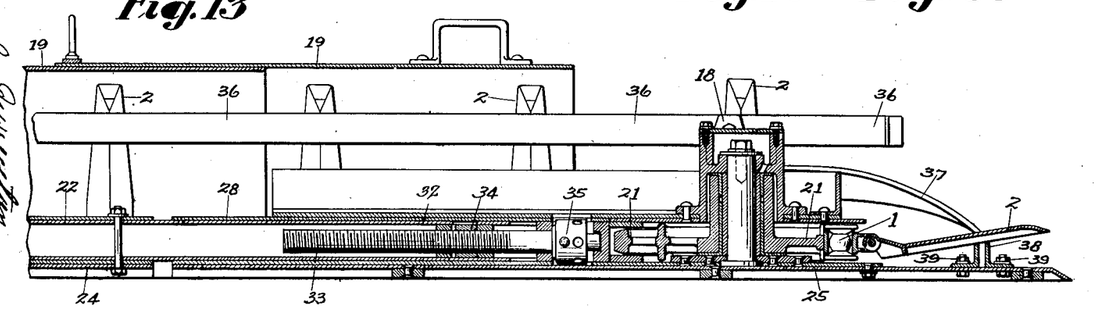
Fig. 13 is a vertical longitudinal section taken substantially along the line XIII—XIII of Fig. 3.

Each of the intermediate frame sections B consists of a bottom plate 3 of such construction as to form a suitable support to rest upon and slide over the floor of the mine. The forward lateral edge of the plate 3 is turned downwardly, as shown at 4 in Fig. 8, to insure contact with the mine floor and reduce the danger of said plate riding over loose masses of material. To the plate 3 is secured a pair of angle bars 5 which are joined together at their ends by the hinge members 6 and 7, secured to said angle bars 5 by suitable rivets, as shown. The hinge member 6 has formed therein a socket 8 adapted to receive the ball 9 of the hinge member 7 of the adjacent frame section, and the proportions and arrangements of these parts are such that they permit angular movement of adjacent sections in both vertical and horizontal directions, and also permit them to be engaged and disengaged by relative vertical movement, as will be clear from Figs. 9 and 10. Mounted on the bars 5, and preferably formed upon the hinge members 6 and 7, are the upstanding lugs 10 which project through suitable apertures in the top plate 11, and a key 12 thrust through an aperture of the lugs 10 locks the top plate 11 against the upper edges of the angle bars 5. The top plate 11 is provided with guide flanges 13 which cooperate with guide bars 14 secured to the bottom plate 3 to confine the conveyor chain 1 to the guideways provided by the elements above described, and these guide flanges 13 are preferably and conveniently formed by turning the edges of the plate 11 downwardly.

The construction permits the ready taking down or assembling of the sectional conveyor so that it may be increased or decreased as to its length at the points of operation, and without the use of special tools or the need of skilled mechanics. The keys 12 may be readily removed, the plates 11 lifted for exposing the chain, and the sections removed or inserted, as desired.

The conveyor chain 1 may be of any type suitable to the needs of the work to be done. In the drawings I have shown a chain adapted to flexure in both vertical and horizontal directions, and provided at suitable intervals with coupling links 15 by which said chain may be conveniently uncoupled and reunited to facilitate the addition or subtraction of one or more of the intermediate sections B to vary the total length of the conveyor. Such a chain is disclosed in my co-pending application Serial No. 721,871, filed June 25, 1924, and need not be further described at this time. When a section B of the conveyor is to be inserted or removed from the conveyor, the top plate 11 may be removed from a conveniently positioned frame section B by the withdrawal of the locking members 12, thereby exposing the conveyor chain 1 to permit of its being uncoupled. After the adjustments are completed, and the chain is recoupled, the top plate 11 may be replaced and the chain 1 held in place for service.

Pivotally mounted upon the chain 1 for vertical movement is a series of shovel-like conveyor flights 2 adapted to slide along the upper surface 16 of the bottom plate 3, and beneath the fragments of coal lying thereon to carry said coal along said bottom plate.

Figure 8:
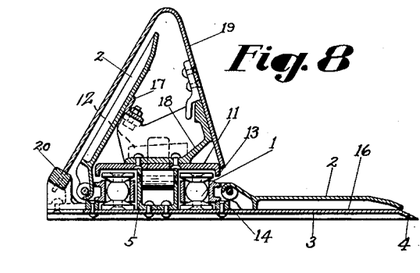
Fig. 8 is a transverse sectional view taken substantially along the line VIII—VIII of Fig. 3.

To reduce the overall width of the apparatus, and thereby reduce the working area necessary for its operation, the bottom plate 3 is cut away along the outer edge of the guide frame, at the left side, as shown in Fig. 8, and the conveyor flights 2 are turned upwardly on their pivots, by devices shortly to be described, to a substantially vertical position as they travel along the return side of the conveyor. The said flights 2 are maintained in this substantially vertical position by means of guide bars 17 attached to the supporting members 18 which are secured to the top plates 11. These supporting members 18 also uphold a shield or cover 19 which is preferably of inverted V-shape, and which serves to house the upstanding flights and prevent accidental contact with the operator or other object external of the conveyor. Lugs 20 attached at convenient intervals along the rear edge of the bottom plate 3, engage the rear edge of the shield plate 19 to assist in maintaining said shield in operative relation with the other parts of the conveyor. The shape and disposition of the shield 19 adapts it to act as a sidewall for the conveyor trough, the bottom of which is formed by the surface 16 of the bottom plate 3. It will thus be seen that the shield plate 19 not only houses the flights 2 as they return in the idle position to the foot of the apparatus, but that it also forms one side of the trough along which the conveyor flights 2 in the active working position move the coal. No side wall is provided or necessary along the opposite side of the conveyor, for the pile of coal upon the mine floor serves to confine the coal upon the bottom plate 3 in the same manner that it would be confined by a side wall, the coal under movement being carried along in the trough formed between the shield 19 and the opposite mass of coal.

The foot section C, see Figs. 3, 4, 13, 14, 15, 16 and 17, differs from the intermediate sections B in that it is expanded laterally towards its free, or inner, end to accommodate the foot wheel 21, and its guideways 22 and 23 so diverge as to lead the chain 1 from the guideways of the adjacent intermediate section to the foot wheel 21, and from said foot wheel back to the guideway of the intermediate section. The section C is also divided midway its length and the two portions thus formed are longitudinally adjustable relative to each other to effect the tensioning of the conveyor chain 1.

Figure 16:
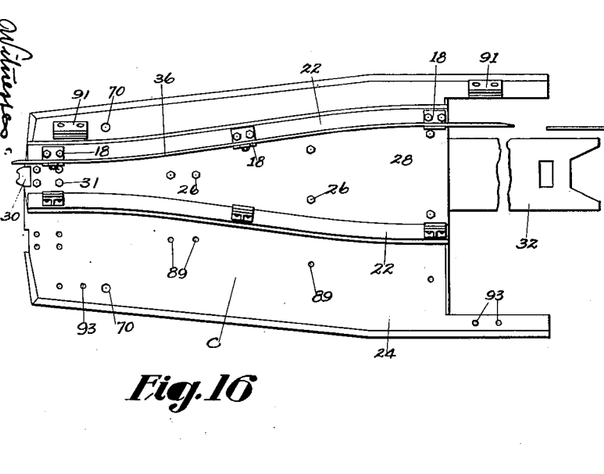
Fig. 16 is a plan view of the guide frame of the outer portion of the foot section of the conveyor disassociated from the other parts.
Figure 17:
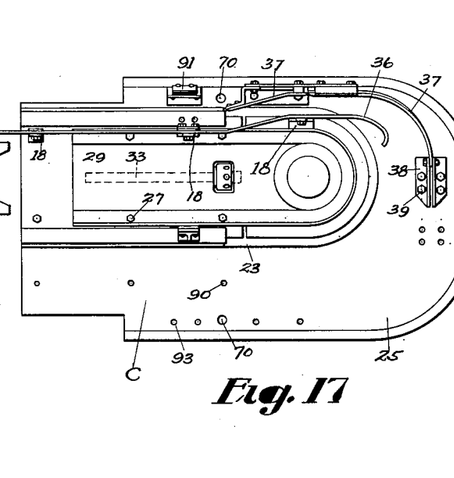
Fig. 17 is a plan view of the guide frame of the terminal portion of the foot section of the conveyor disassociated from the other parts.

The two portions of the section C comprise the bottom plates 24 and 25, the adjacent ends of which are shaped as shown in Figs. 16 and 17, to afford a continuous support for the conveyor flights 2 and the material carried thereby in all positions of longitudinal adjustment. Secured to the bottom plates 24 and 25, by suitable attachment bolts 26 and 27, are the box-like frames 28 and 29 along the lateral edges of which are formed the chain guides 22 and 23. A hinge member 30 substantially similar to the hinge members 6, and arranged to connect the section C with the adjacent section B, and to insure the proper registration of the chain guides of the respective sections, is attached to the frame 28 by suitable vertically disposed attachment bolts 31. The frame 28 is provided with a longitudinally projecting tongue 32 adapted to slidably fit into a suitably formed recess of the frame 29, and these parts are secured in operative relation to each other by a longitudinally extending screw 33, which is attached to the inner frame section 29, and which is screw threaded into a nut 34 fixed to the frame 28. The screw 33 is provided with a head 35 adapted to be engaged by a suitable spanner wrench, or other convenient tool, whereby the screw 33 may be rotated to longitudinally adjust the frame 28 and its attached bottom plate 24 relative to the frame and its bottom plate 25.

Figure 14:
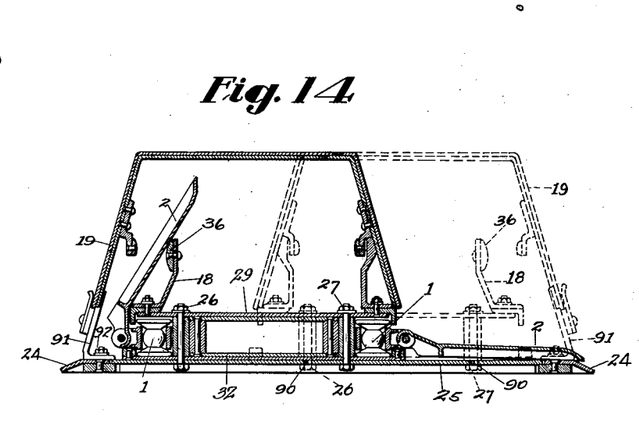
Fig. 14 is a transverse vertical section taken substantially along the line XIV—XIV of Fig. 3.
Figure 15:
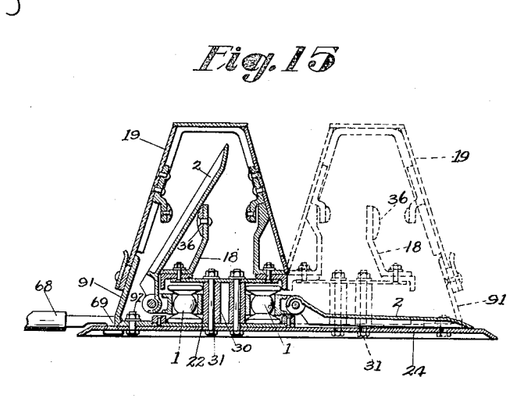
Fig. 15 is a transverse vertical section taken substantially along the line XV—XV of Fig. 3.

Adjacent the foot wheel 21 the guide bar 36 is bent outwardly and provided with an annular portion eccentrically disposed with relation to sprocket 21 (Figure 3) so as to positively rotate the returning conveyor flights toward the horizontal position, and a secondary guide bar 37 affords means to control the return of these flights to their horizontal operative position. Bar 36 may conveniently have rounded edges as indicated in Figures 14 and 15. The secondary guide bar 37 is so shaped that if the conveyor chain 1 were moved in the reverse direction, the conveyor flights 2 will turn upwardly to their vertical position to travel along the return strand of the conveyor in the same manner as when traveling in the forward direction. The secondary guide bar 37 is attached to a bracket 38, which is bolted to the bottom plate 25 by the vertically disposed attachment bolts 39.

The head section A of the conveyor, as shown in Figs. 1, 2, 5, 6 and 7, is mounted upon a framework having a bottom plate 40 adapted to rest upon and slide in any direction over the mine floor. Upon this framework are supported the guideways 41 and 42 which are of similar construction to those above described and a hinge member is provided in similar relation to the guideways as in the other sections. At their inner ends the guideways 41 and 42 register with the corresponding guideways of the adjacent conveyor section B, and they diverge outwardly to guide the conveyor chain 1 to and from the driving sprocket wheel 44. Extending along the forward side of the forward guideway 42 is a conveyor trough having a bottom plate 45 which is adapted to receive the conveyor flights 2 and the material carried thereby from the bottom plate 3 of the adjacent conveyor section B, and this plate is bent longitudinally to form the flaring side wall 46 of the conveyor trough. The opposite wall of the trough is formed by a vertical plate 47 which is also a part of the shield structure by which the mechanism is protected.

Figure 2:
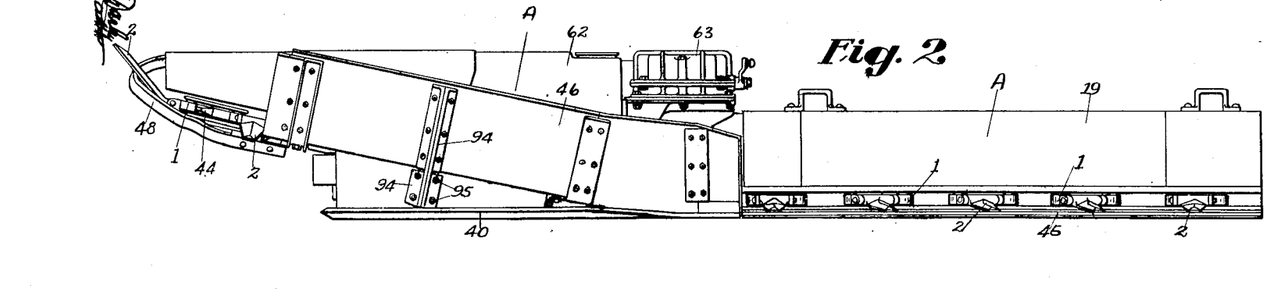
Fig. 2 is a side elevation of the mechanism illustrated in Fig. 1.
Figure 3:
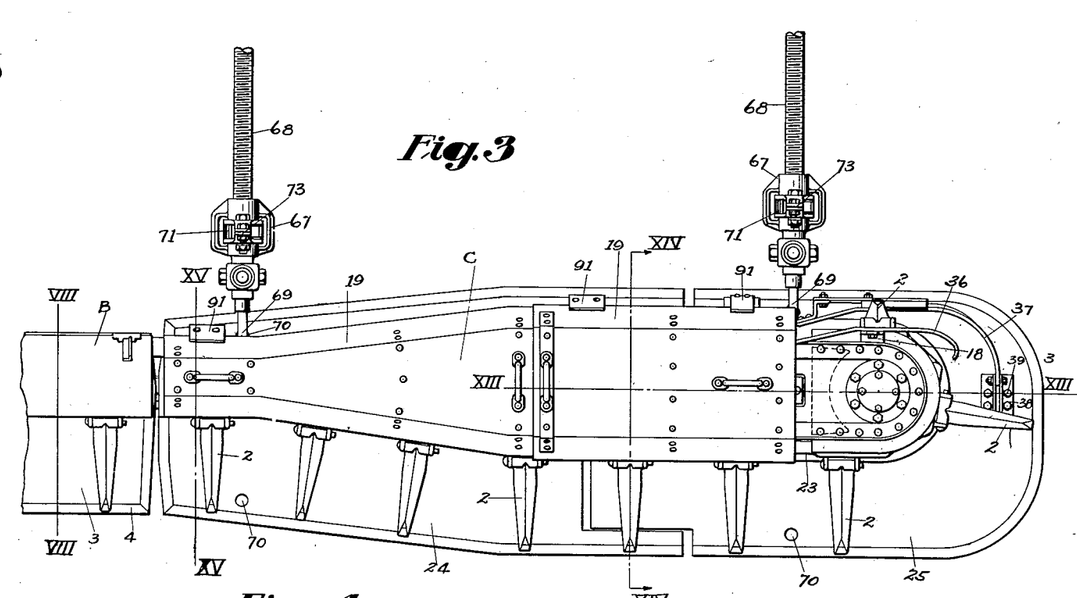
Fig. 3 is a plan view of the foot end section of my improved coal handling mechanism.
Figure 4:
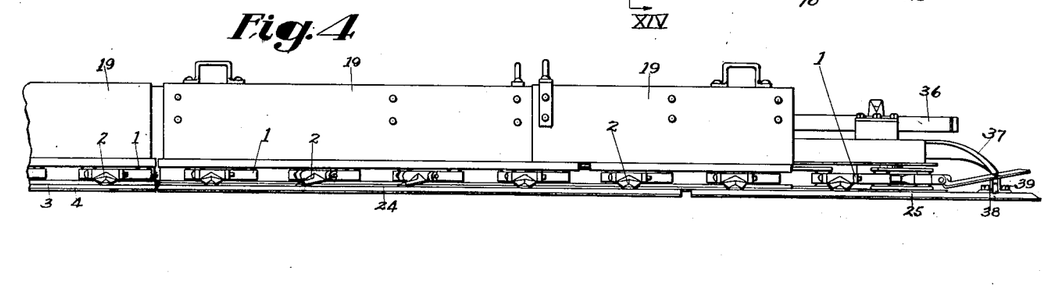
Fig. 4 is a side elevation of the mechanism illustrated in Fig. 3.
Figure 5:
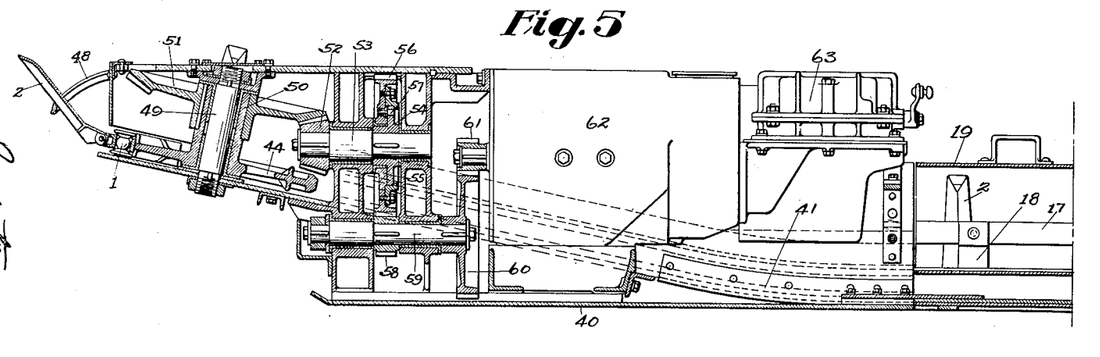
Fig. 5 is a longitudinal vertical sectional view taken substantially along the line V—V of Fig. 1.

The guideways 41 and 42, and the trough plate 45 are curved upwardly, as shown in Figs. 2 and 5, in order that they may project above the receptacle into which the dislodged coal is to be delivered. A suitably shaped guidebar 48 projects beyond the periphery of the sprocket wheel 44 to support the conveyor flights as they pass around the sprocket wheel. As the flights 2 leave the conveyor trough 45 they are engaged by the bar 48, and by it are turned upwardly into a substantially vertical position, and are finally delivered to the guide bar 17 of the return run of the conveyor.

The head sprocket wheel 44 is mounted for free rotation upon a stationary shaft 49 which is fixed to the framework of the conveyor, and to its extended hub 50 is secured a bevel gear 51. The bevel gear 51 is engaged by a bevel pinion 52 fixed to the horizontal driving shaft 53 which is supported in suitable bearings of the conveyor frame. To the driving shaft 53 is fixed a hub 54 having a radially extending flange 55. A spur gear wheel 56 is mounted for free rotation upon the hub 54 adjacent the flange 55, and these parts are adapted to be connected together by a shear pin 57 projecting through registering apertures in the gear wheel 56 and the flange 55. This shear pin 57 constitutes a safety coupling device by which the power transmitted to the head shaft of the conveyor is limited. The gear wheel 56 engages with a pinion 58 attached to a counter shaft 59, and this counter shaft 59 is connected through the speed reducing gears 60 and 61 with the driving shaft of the motor 62.

The motor 62 may be of any preferred type suitable to the conditions under which the machine is operated. For purposes of illustration, I have here shown an electric motor adapted to receive its actuating current from any convenient source of electric supply, through a suitable conductor, not shown in the drawings, and to be controlled by a suitable controlling mechanism, such as the controller 63 which is preferably mounted upon the frame of the conveyor adjacent the inner end of the motor frame, but as these devices are well understood in the art, and as they form no part in the present invention, further description and illustration is not thought to be required at this time.

Figure 18:
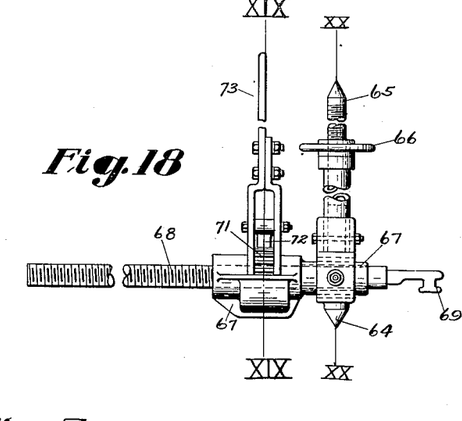
Fig. 18 is a side elevation of the feeding mechanism by which the conveyor is bodily moved relative to the material to be handled.
Figure 19:
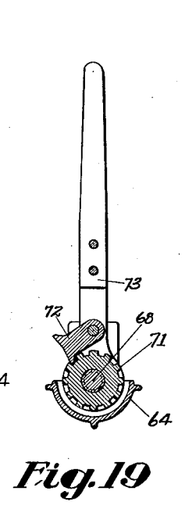
Fig. 19 is a transverse sectional view taken along substantially the line XIX—XIX of Fig. 18.
Figure 20:
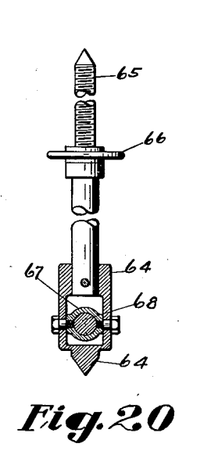
Fig. 20 is a sectional view taken along substantially the line XX—XX of Fig. 18.
Figure 21:
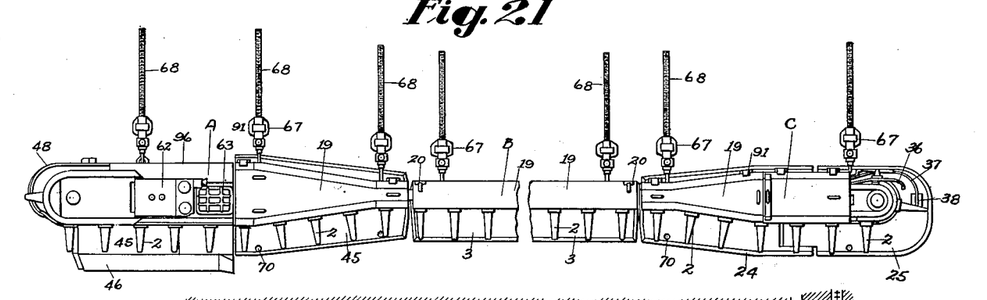
Fig. 21 is a general plan view on a reduced scale showing several sections of the conveyor assembled in operative relation to each other.

Due to the flexibility of the coupling between adjacent conveyor sections, each section may be moved independently of the others towards the material which is to be transported. Any preferred mechanism may be used to apply a lateral moving effort to the conveyor sections. For purposes of illustration, I have shown in Figs. 18, 19 and 20 a mechanism suited to the purpose, comprising an anchor jack having a floor engaging portion 64 and a telescoping roof engaging portion 65 which may be forced apart by the hand wheel nut 66 screw threaded to the portion 65, to securely anchor the jack in position to act as an abutment against which the moving effort may react. Attached to the floor engaging section 64 is a sleeve 67 through which extends an elongated screw 68 having at one end a hook 69 adapted to engage suitable apertures 70 of the bottom plates of the several conveyor sections. Positioned in a recess of the sleeve 67 and screw threaded to the screw 68 is a nut 71 upon the periphery of which is formed suitable ratchet teeth adapted to engage the double acting pawl 72. The pawl 72 is pivotally attached to a lever 73 which is adapted to rock about the axis of the screw 68 in such manner that oscillation of the lever 73 will cause the rotation of the nut 71 and the consequent longitudinal movement of the screw 68 relative to the jack. By the positioning of the pawl 72 at one side or the other of the lever 73, the nut 71 may be caused to rotate in the preferred direction to thereby move the conveyor either towards or from the material which is to be transported.

Figure 22:
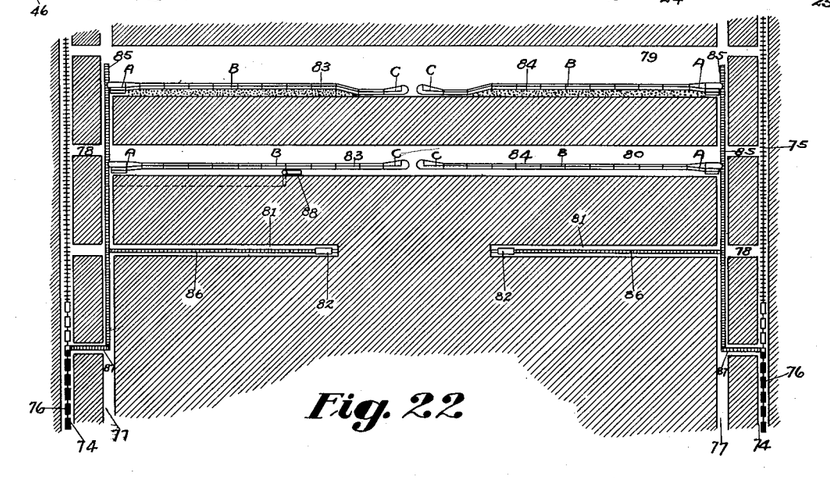
Fig. 22 is a diagrammatic plan view of a coal mine equipped with the devices of my present invention.

In Fig. 22 I have shown diagrammatically a mining operation involving the use of my improved coal handling machine. It is to be understood, however, that this installation is but illustrative of the use of the machine, and in no way restrictive of said use. In the development here illustrated, preliminary to further development, a pair of spaced apart parallel entries 74 are driven across the territory to be mined, and in each of these entries are laid tracks 75, over which travel the cars 76, by which coal is transported from the mine. Room entries 77, extending parallel with and adjacent to the haulage entries 74 are driven, and suitable break throughs 78 are provided to afford the ventilation which is required. The room entries 77 are so spaced from the haulage entries 74 that the intervening pillar of coal will be of sufficient thickness to afford safe support for the roof of the haulage entries during all stages of operation. Preparatory to the installation of my improved loading machine, relatively narrow passages 79, 80, 81, etc., are driven between the entries 77, preferably in alignment with the break throughs 78, and these passages provide the relatively long working faces required for the economical operation of my machine. The entries, break throughs and passages above described may be driven in any preferred manner suitable to existing conditions. In the operation here illustrated, I have contemplated the use of entry driving mechanism such as are disclosed in my co-pending application Serial No. 697,790, filed March 8, 1924, and such machines are indicated at 82 in Fig. 22, working towards each other to form the passage 81. In each of the passages 79 and 80 there are installed two loading machines 83 and 84, the length of which have been so adjusted that their foot sections C may lie in close proximity to each other midway the length of the passage, while their head sections A are in the entries 77.

As a means for collecting the coal from the several machines involved in this operation, I have provided elongated, continuously moving conveyors 85, which may be of any preferred type, such as belt conveyors, scraper conveyors, or the like, and these conveyors extend along the room entries 77 in position to receive the material discharged from the coal handling machines 83 and 84. Branch conveyors 86 of the same general type, are also placed in the passages 81 to receive the coal from the entry driving machines 82 and to transfer it to the conveyors 85. Cross conveyors 87 are positioned in convenient break throughs to receive the material delivered by the conveyors 85 and to deliver a continuous flow of coal to the cars 76 of a moving train as they pass along the haulage track 74 beneath the delivery end of the cross conveyors 87. By this means, interruption of the several mining machines to permit the movement of cars is avoided for long periods of time, and if proper attention is paid to the manipulation of the trains of cars upon the main tracks, such interruptions need never occur.

The principal mining operation which is conducted along the rib face of each of the passages 79 and 80 is as follows. The coal is first undercut, preferably by a machine 88 of the well known longwall type, having a frame adapted to slide along the mine floor between the loading machine and the coal face, and having a cutter arm adapted to extend perpendicularly into the coal face and to cut a kerf therein as the machine moves. After being undercut, the coal is dislodged in any suitable and preferred manner, such as by blasting, causing the shattered and loosened coal to fall downwardly and outwardly in a pile extending along the entire face of the room. The foot section C of the loading machine may then be moved forwardly to cause the flights 2 to engage the broken coal upon the mine floor and move it longitudinally of the machine towards the entry 77 where it is discharged into the main conveyor 85. As the work progresses, each successive section of the loading machine is moved towards the dislodged coal until all of said coal has been loaded.

As shown in Fig. 22, my improved apparatus for handling coal is sometimes required to transport material towards the right hand and sometimes towards the left. As heretofore constructed, the direction of travel for which the machine was adapted was determined at the time of building the apparatus, and when designed for left hand travel a machine could not be adapted for use upon a mine face limited to delivery at its right hand extremity. To overcome this difficulty I have arranged certain parts of the machine so that they may be conveniently and expeditiously separated from the other parts and reassembled in such relation as to adapt the machine for operation in the opposite direction.

The intermediate section B, being symmetrical in form, it is apparent that the chain 1 and conveyor flight 2 may travel in either direction desired, and that no modification of their design is required.

In the end sections A and C, however, due to their unsymmetrical form, the conveyor trough and guiding devices must be transferred from one side of the center line of the conveyor to the other in order to effect a desired change in the direction of operation.

As shown in Figs. 14, 15, 16 and 17, the guiding frames 22 and 23 are formed as self contained box-like structures which are attached to the bottom plates 24 and 25 by a plurality of vertically disposed attachment bolts 26 and 27, and an auxiliary series of apertures 89 and 90 are provided in said bottom plates, so positioned and arranged that when the guide frames 22 and 23 are moved to operative positions upon the opposite sides of the center line of the conveyor, these apertures 89 and 90 will receive the bolts 26 and 27. In like manner the lugs 91 are secured to the bottom plates 24 and 25 by vertically disposed attachment bolts 92 which may be optionally inserted in the apertures 93 at either edge of the bottom plates. The guide bar 36 and 37 may be adjusted in the same manner as the lugs 91.

Figure 1:
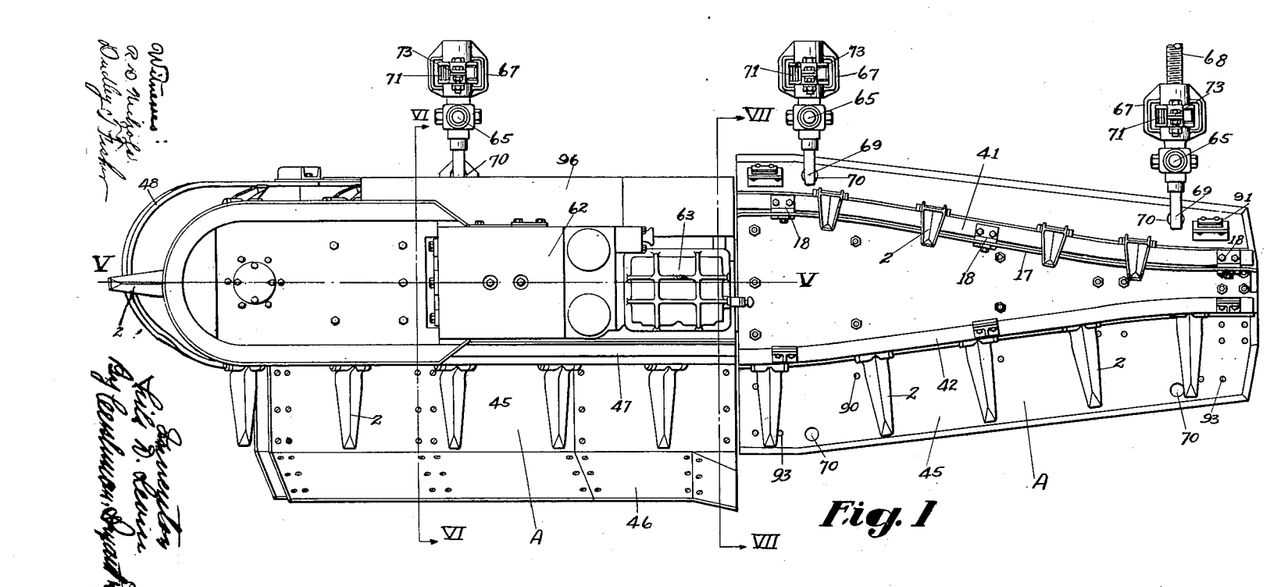
Fig. 1 is a plan view of the driving, or head end section of my improved coal handling mechanism.
Figure 6:
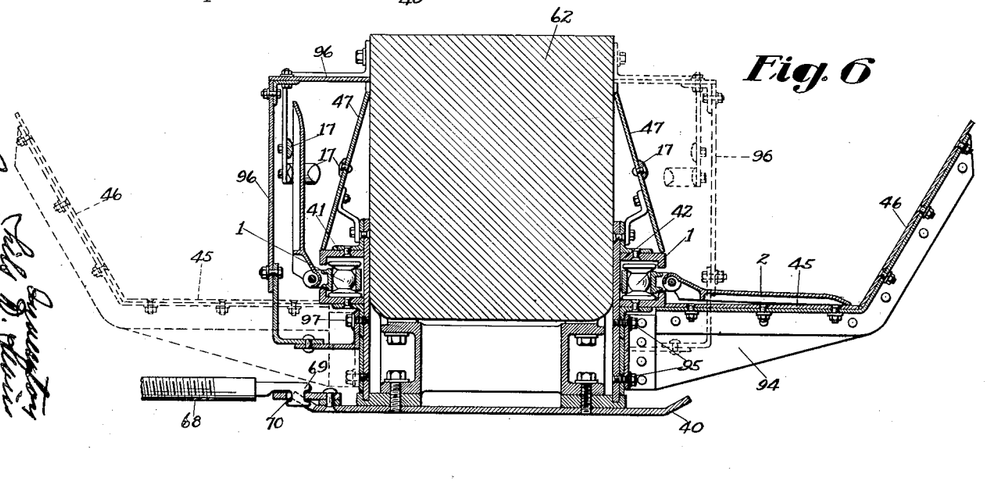
Fig. 6 is a transverse sectional view taken substantially along the line VI—VI of Fig. 1, the motor being conventionally depicted.
Figure 7:
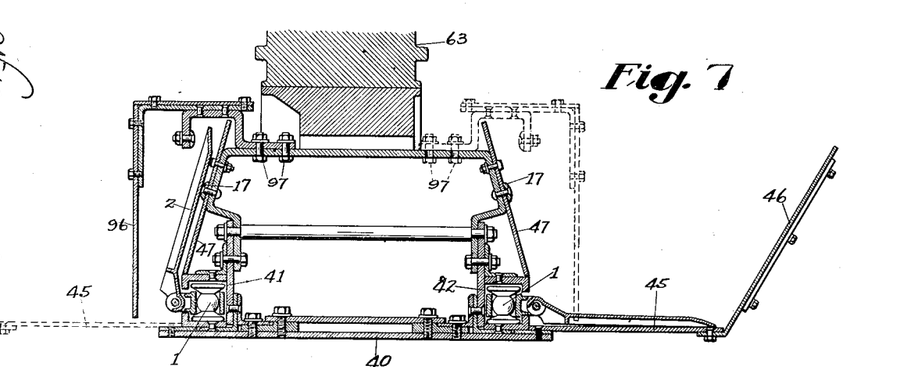
Fig. 7 is a transverse sectional view taken substantially along the line VII—VII of Fig. 1.

On the head section A, as shown in Figs. 1, 6 and 7, the trough plate 45 is supported upon brackets 94 which are attached to the frame members by the machine screw 95, and duplicate apertures are provided to receive these machine screws at either side of the frame. The housing 96, with its guide bars 17, are also supported by machine screws at either side of the frame. The housing 96, with its guide bars 17, are also supported by machine screws 97 adapted to engage suitable apertures in both sides of the frame.

It is apparent that when the intermediate sections B are turned end for end that the hinge members 6 and 7 will be reversed in their relation to the hinge members upon the sections A and C. I have therefore attached the hinge members 30 and 30 to the sections A and B by vertically disposed attachment bolts 31 thereby facilitating the transfer of these hinge members from one section to the other as the case may require.

By the arrangement of parts above described, the head section A and the foot section C may be conveniently and expeditiously adjusted for operation either towards the right hand or towards the left.

What I claim is:—

1. In a machine of the class described, the combination with an elongated frame, an endless chain mounted thereon, means for driving the chain, gathering elements movably mounted on the chain, means for rendering the gathering elements inactive along one side of said frame, the parts being adjustable to place the inactive elements at the preferred side of the frame.

2. In a machine of the class described, the combination with an elongated frame, an endless chain mounted thereon, means for driving the chain, gathering elements movably mounted on the chain, means for rendering the gathering elements inactive along one side of the frame, means to house the inactive elements, the parts being adjustable to place the inactive elements and the housing at the preferred side of the frame.

3. In a machine of the class described, the combination with an elongated frame, an endless chain mounted thereon, means for driving the chain, gathering elements movably mounted on the chain, and means for moving said gathering elements to an inactive position during a predetermined portion of their travel said moving means being adjustable to place the inactive elements at the preferred side of the frame.

4. In a machine of the class described, the combination of an elongated frame an endless chain mounted thereon, means to drive said chain, gathering elements movably mounted on said chain and adapted to lie in a substantially horizontal active position, and means for moving said gathering element to a substantially vertical inactive position during a predetermined portion of their travel said moving means being adjustable to place said inactive elements at the preferred side of the frame.

5. In a machine of the class described, the combination of a frame, an endless chain mounted thereon, driving means therefor, gathering elements pivotally mounted on said chain adapted to lie in a substantially horizontal active position, means to automatically move said gathering elements to a substantially vertical inactive position during a predetermined portion of their travel, means automatically to return them to their active position, and means for housing said elements when in their inactive position said moving means and housing being adjustable to place said active and inactive positions at the preferred side of the frame.

6. In a machine of the class described, the combination of a relatively narrow frame, having a widened head section, a power unit mounted on said head section, an endless chain driven from said power unit, gathering flights on said chain adapted to lie in a substantially horizontal active position along one side of the frame, and means on said head section to move said gathering flights to a substantially vertical inactive position on the other side of said frame, said moving means being adjustable to place said active and inactive positions at the preferred side of the frame.

7. In a machine of the class described, the combination of a relatively narrow frame having a widened head section and a widened foot section, a power unit on said head section, an endless chain driven from said power unit, gathering flights on said chain adapted to lie in a substantially horizontal active position along one side of said frame, means on said head section to move said gathering flights to a substantially vertical inactive position at the other side of said frame, means on said foot section to return said gathering flights to their active position, the parts being adjustable to place said active and inactive positions at the preferred side of the frame.

8. In a machine of the class described, the combination of a relatively narrow frame having a widened head section and a widened foot section, a power unit on said head section, an endless chain driven by said power unit, gathering flights on said chain adapted to lie in a substantially horizontal active position along one side of said frame, means on said head section to move said gathering flights to a substantially vertical inactive position at the other side of said frame, means on said foot section to return said gathering flights to their active position, the parts being adjustable to place the active and inactive positions at the preferred side of the frame.

9. In a machine of the class described, the combination of a relatively narrow frame having a widened head section and a widened foot section, a power unit on said head section, an endless chain driven by said power unit, gathering flights on said chain adapted to lie in a substantially horizontal active position along one side of said frame, means on said head section to move said gathering flights to a substantially vertical inactive position at the other side of said frame, means on said foot section to return said gathering flights to their active position, and means for housing said flights in their inactive position, the parts being adjustable to place the active and inactive positions at the preferred side of the frame.

10. In a machine of the class described, the combination of a relatively narrow frame having a widened head section, a power unit on said head section, a material receiving trough on one side of said head section, an endless chain driven from said power unit, gathering flights pivotally mounted on said chain adapted to lie in a substantially horizontal active position to move material along said trough, guide members on said head section to move said flights to a substantially vertical inactive position on the other side of said frame, the trough and guide members being adjustable to place said active and inactive positions at the preferred side of the frame.

11. In a machine of the class described, the combination of a relatively narrow frame having a widened head section and a widened foot section, a power unit on said head section, a laterally projecting plate along one side of said frame adapted to receive material to be transported, an endless chain driven by said power unit, gathering flights pivotally mounted upon said chain adapted to lie in a substantially horizontal active position to move material along side plate, guide members on said head section to move said flights to a substantially vertical inactive position at the other side of said frame, guide members on said foot section to return said flights to the active position, said plates and said guide members being adjustable so that said active and said inactive positions may be placed at the preferred side of the frame.

12. In a machine of the class described, the combination of a relatively narrow frame having a widened head section and a widened foot section, a power unit on said head section, a laterally projecting plate along one side of said frame adapted to receive material to be transported, an endless chain driven by said power unit, gathering flights pivotally mounted upon said chain adapted to lie in substantially horizontal active positions to move said material along said plate, guide members on said head section to move said flights to a substantially vertical inactive position at the other side of said frame, guide members on said foot section to return said flights to the active position, means to house said flights in their inactive position, said plate guide members and housing being adjustable so that said active and inactive positions may be placed at the preferred side of the frame.

13. In a conveyor, a plate, conveyor chain sections adapted to travel in opposite directions thereon, flights on said sections, and means for guiding said chain sections with the flights of either one of them in operative relation to the plate and with the flights of the other in inoperative relation to the plate.

14. In a conveyor, a plate, conveyor chain sections adapted to travel in opposite directions thereon, flights on said chain sections, and adjustable guide means for guiding said sections with the flights of either one of them near one edge of the plate and with the flights of the other in inwardly spaced relation to the opposite edge whereby the flights on said other section only extend over said plate in operative relation thereto.

15. In a conveyor, a plate, conveyor chain sections adapted to travel in opposite directions thereon, flights on said chain sections, means for guiding one of said chain sections near one edge of said plate and the other chain section in inwardly spaced relation to the opposite edge whereby the flights of said other section only extend over the plate in operative relation thereto, said guide means being displaceable on said plate for reversing the positional relation of said chain sections to the latter, for the purpose described.

16. In a conveyor, a plate, conveyor chain sections adapted to travel in opposite directions thereon, flights pivoted to said sections, means for guiding said chain sections with the flights of either one of them in operative relation to the plate and with the flights of the other in inoperative relation to the plate, and means for swinging the inoperative flights out of their normal plane.

17. In a conveyor, a plate, conveyor chain sections adapted to travel in opposite directions thereon, flights pivoted to said chain sections, means for guiding one of said chain sections near one edge of said plate and the other chain section in inwardly spaced relation to the opposite edge, whereby the flights on said other chain section only extend over the plate in operative relation thereto, and means for swinging the flights of said first named section out of their normal plane, said guide means being displaceable on said plate for reversing the positional relation of said chain sections to the latter, for the purpose described.

18. The combination with a bottom plate, a sprocket wheel mounted thereon, a flight carrying chain having pivotally connected flights, and an outer downwardly tapering flight support; of a depressing fender for the flights located above their annular pathway about the sprocket wheel to move the flights toward said support, said fender having a rounded bearing edge portion.

19. In a conveyor provided with a bottom plate, a sprocket wheel mounted thereon, an upper covering plate, a chain passing around the sprocket wheel having a series of laterally extending pivoted flights, and an outer flight bearing rail provided with a downwardly tapering terminal portion for delivering the flights flatwise upon the bottom plate; the combination therewith of a continuous annular flight depressing fender located above the annular path of the flights about the sprocket wheel and inwardly of the flight bearing rail to move the flights toward said terminal portion.

20. In a conveyor provided with a bottom plate, a sprocket wheel mounted thereon, an upper covering plate, a chain passing around the sprocket wheel having a series of laterally extending pivoted flights, an outer flight bearing rail extending along and beyond the chain at one side having an outwardly rounded and downwardly tapering terminal portion for delivering the flights flatwise upon the bottom plane, and an inner guard rail for the flights substantially parallel with the outer flight bearing rail; the combination therewith of a flight depressing fender forming a continuation of the inner guard rail and arranged annularly around above the path of the flights beyond the sprocket wheel to move the flights toward the terminal portion.

21. A conveyor suitable for use in longwall mining comprising a plurality of substantially horizontally disposed pivotally connected sections each including a base platform, and including an endless conveyor operably connected over said sections in exposed coal re-receiving position at a longitudinal side of each section, and adjustment means in connection with the other longitudinal side of each of said sections selectively operable to adjust the sections in either direction transversely of themselves to bring them into or out of alignment.

22. A conveyor and loader adapted for use in connection with longwall mining comprising a plurality of pivotally connected substantially horizontally disposed conveyor sections each including a substantially horizontal plate and an endless conveyor operably connecting said plates for lateral adjustment, and a loader head for the conveyor including an upwardly inclined plate pivotally connected by said endless conveyor to the other plates, and driving mechanism including a motor mounted along the central longitudinal axis of said loader head for driving said endless conveyor.

23. In a loading conveyor the combination of a flat shallow platform constructed to be horizontally positioned in ground engagement, an endless conveyor, means substantially to one side of the longitudinal center of the platform for movably mounting the endless conveyor thereon, flights on the endless conveyor adapted for extension therefrom over the platform to the opposite side of the longitudinal center of the platform, said flights at their free ends being adapted to lie inwardly of the longitudinal edge of said platform for a predetermined distance.

24. In a loading conveyor for mining, the combination of a loader head, a tail section, intermediate sections, an endless chain, means mounting the endless chain upon the loader head, and tail and intermediate sections for movement thereover, said loader head and tail and intermediate sections each having a loading extension to a side of said endless chain, flights for the endless chain operable over said loading extensions of said loader head and tail and intermediate sections, said loading head and tail sections being interchangeable so as to place the loading extensions thereof to either side of the longitudinal center of said loader head and tail section.

25. In a loading conveyor the combination with a loading head including a platform body, an endless conveyor movable over the platform body, flights connected with the endless conveyor, a removable platform extension, and means for attaching the removable platform extension to either side of the platform body so that the flights may travel thereover.

26. In a loading conveyor the combination with a loading head including a platform body, an endless conveyor movable over the platform body, flights connected with the endless conveyor, a removable platform extension, means for attaching the removable platform extensions to either side of the platform body so that the flights may travel thereover, and removable flight supporting means for attachment at the opposite side of the platform body from said platform extension in order to collapse the flights in an upwardly extending relation.

27. In a loading conveyor the combination with a loading head including a platform body, an endless conveyor movable over the platform body, flights connected with the endless conveyor, a removable platform extension, means for attaching the removable platform extension to either side of the platform body so that the flights may travel thereover, and power means carried by said platform body for driving said endless conveyor.

28. The combination with an endless carrying chain having a series of pivotally connected flights, of means adjacent one run of the chain for swinging the flights transversely of the line of the chain to an inoperative position, a support for the inoperative flights having a portion curved about the foot end of said chain and inclined to guide the flights to their operative plane, and a curved flight depressing fender above said curved and inclined portion to move the flights toward the latter.

In testimony whereof I have hereunto set my hand.

NILS D. LEVIN.